United States Patent [19]

Bae

[11] Patent Number: 4,975,774
[45] Date of Patent: Dec. 4, 1990

[54] ART PROCESSOR IN A PICTURE-IN-PICTURE SYSTEM

[75] Inventor: Jum-Han Bae, Kyounggi-do, Rep. of Korea

[73] Assignee: SamSung Electronics Co., Ltd., Suwon, Rep. of Korea

[21] Appl. No.: 388,407

[22] Filed: Aug. 2, 1989

[30] Foreign Application Priority Data

Aug. 2, 1988 [KR] Rep. of Korea .......................... 12828

[51] Int. Cl.⁵ ............................................. H04N 5/272
[52] U.S. Cl. ......................................... 358/183; 358/22
[58] Field of Search .......................... 358/183, 22, 148; 340/723, 744, 747

[56] References Cited

U.S. PATENT DOCUMENTS

| 4,212,009 | 7/1980 | Adleman et al. | 340/747 |
| 4,386,363 | 5/1983 | Morrison | 358/22 |
| 4,580,165 | 4/1986 | Patton et al. | 358/148 |
| 4,682,226 | 7/1987 | Kadlec | 358/148 |
| 4,682,234 | 7/1987 | Naimpally | 358/183 |
| 4,727,362 | 2/1988 | Rackley et al. | 358/148 |
| 4,777,531 | 10/1988 | Hakamada et al. | 358/183 |
| 4,847,608 | 7/1989 | Bouron | 340/747 |
| 4,894,719 | 1/1990 | Moon | 358/148 |
| 4,903,127 | 2/1990 | Phillips | 358/22 |

FOREIGN PATENT DOCUMENTS 1278929 12/1986 U.S.S.R. .............................. 340/723

Primary Examiner—Tommy P. Chin
Assistant Examiner—James Juo
Attorney, Agent, or Firm—Bushnell, Robert E.

[57] ABSTRACT

An art processor in a picture-in-picture system which performs a given art processing to a subscreen when subscreen the same image source as a main screen. One embodiment to carry out the objects of the invention includes a first synchronous signal detector and a second synchronous signal detector which detect synchronous signals from image sources received, an exclusive OR gate for comparing a first synchronous signal and a second synchronous signal, an integrator for integrating said synchronous signals, a monostable multivibrator for producing a pulse signal having a given width, a DC generator for changing said pulse signal to a smooth DC signal, a driving signal generator for producing a driving signal by use of said DC signal, a switching stage for switching a plurality of input lines of PIP signal according to said driving signal, and a D/A converter for generating a given art signal for the subscreen.

20 Claims, 2 Drawing Sheets

ART PROCESSOR IN A PICTURE-IN-PICTURE SYSTEM

BACKGROUND OF THE INVENTION

The present invention relates to an art processor for use in a picture-in-picture (hereinafter referred to as a PIP) system and particularly to an art processor which performs a given art processing to a subscreen when the subscreen has the same image source that a main screen has, in the PIP system.

In general, the PIP system receiving two different image sources processes one of the two image sources for the subscreen, while another image source for the main screen, the one image source for the subscreen being processed to be suitable to the subscreen in order to insert it into said main screen. However, if the image source for the subscreen has the same signal with another image source for the main screen, then the subscreen becomes the same screen with the main screen, which gives a meaningless PIP screen.

SUMMARY OF THE INVENTION

It is accordingly an object of the present invention to provide an art processor capable of performing an art processing to a subscreen in case that the subscreen has the same image source as a main screen, by use of switching means.

According to one aspect of the present invention, the art processor to carry out the objects, effects and features of the invention includes a first synchronous signal detector and a second synchronous signal detector which detect synchronous signals from image sources received, an exclusive OR gate for comparing a first synchronous signal and a second synchronous signal detected by the detectors, and integrator for integrating the synchronous signals, a monostable multivibrator for producing a pulse signal having a given width according to the signal integrated by said integrator, a DC generator for changing said pulse signal to a DC signal, a driving signal generator for producing a driving signal by use of the DC signal, a switching stage for switching a plurality of input lines of PIP signal according to the driving signal, and a D/A converter for generating a given art signal in order to output it to the subscreen.

BRIEF DESCRIPTION OF THE DRAWINGS

The above and other objects, effects and features of the present invention will become more apparent from the following description of a preferred embodiment thereof taken in conjunction with the accompanying drawings, wherein.

DESCRIPTION OF THE PREFERRED EMBODIMENT

The above and other objects and features of the invention will appear more fully hereinafter from a consideration of the following description taken in connection with the accompanying drawings wherein the embodiments illustrated are presented only by way of example.

Figure 1:
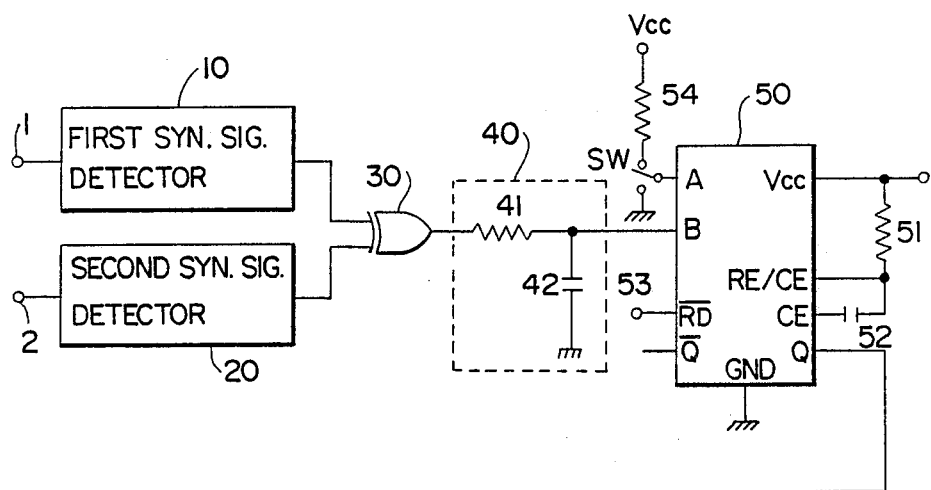
FIG. 1 shows an art processing circuit embodying the present invention.
Figure 1:
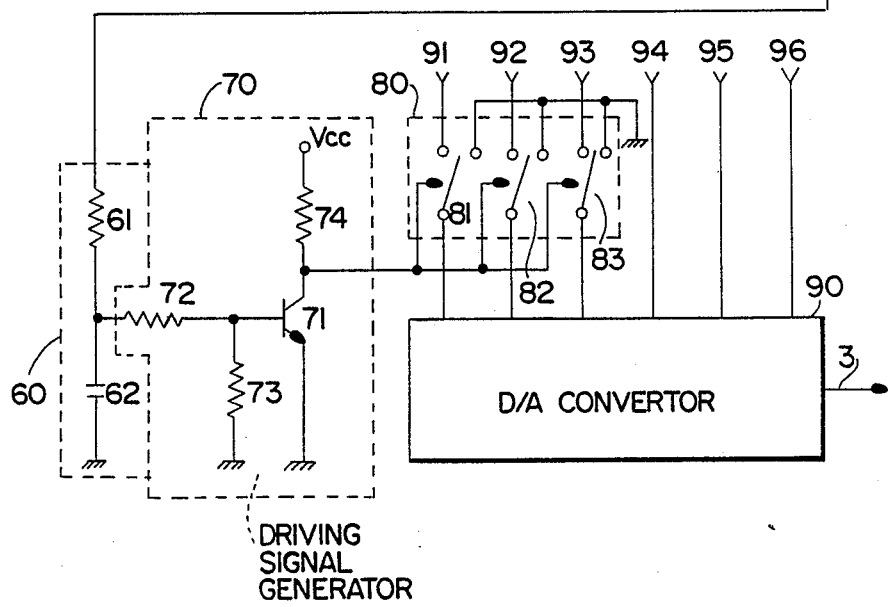

Referring now to FIG. 1, wherein like reference characters designate like or corresponding parts throughout, the inventive art processor includes a first and second synchronous signal detector 10 and 20, an exclusive OR gate 30, an integrator 40, a monostable multivibrator 50, a DC generator 60, a driving signal generator 70, a switching stage 80, and a D/A converter 90.

According to FIG. 1 for embodying the preferred embodiment, the first synchronous signal detector 10 detects a first synchronous signal from a given main screen image source, which is a first image signal, received through a main screen source input terminal 1. In a similar manner the second synchronous signal detector 20 detects a second synchronous signal from a given subscreen image source, which is a second image signal, received through a subscreen source input terminal 2. Then, the exclusive OR gate 30 compares said first synchronous signal and said second synchronous signal by executing the exclusive OR operation. The integrator 40 having a resistor 41 and a capacitor 42 eliminates an impulse component of the signal compared by the exclusive OR gate 30 by filtering operation.

Thereafter, the monostable multivibrator 50 produces a pulse signal having a given time constant according to the integrated signal from the integrator 40 and a logic high signal which is received at a read terminal $\overline{RD}$ through an input terminal 53. The DC generator 60 including of resistor 61 and a capacitor 62 produces a smoothed DC signal by integrating the pulse signal generated from monostable multivibrator 50. The driving signal generator 70 including of a transistor 71 and a plurality of resistors 72 through 74 produces a given driving signal by switching the transistor itself according to the DC signal from the DC generator. Then, the switching stage 80 including of a plurality of switches 81 through 83 switches a plurality of input lines 91 through 93 for controlling the PIP system, according to the driving signal from the driving signal generator 70. Accordingly, the D/A converter 90 receives a given PIP control signal through the entire plurality of lines 91 through 96 for controlling the PIP system, according to the state of the switching stage 80, produces a given PIP luminance signal or art signal and applies the signal to the subscreen through an output line 3. Additionally, a resistor 51 and a capacitor 52 adjust the width of the pulse signal generated from the monostable multivibrator 50.

Figure 2A:
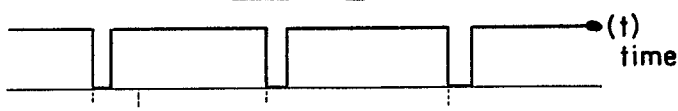
FIGS. 2A-2F slow a waveform diagram specifically illustrating waveforms of each part of the invention according to an embodiment of the invention.
Figure 2B:
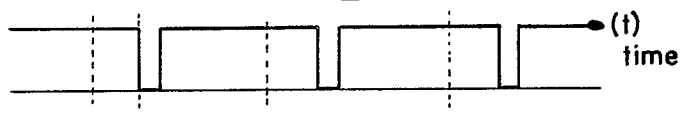
Figure 2C:
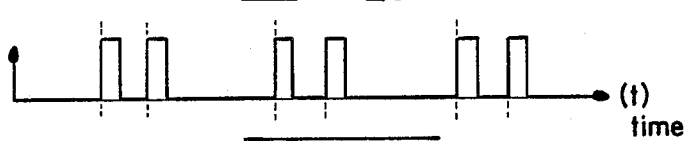
Figure 2D:
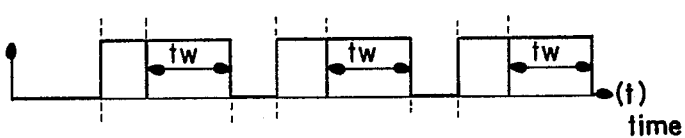
Figure 2E:
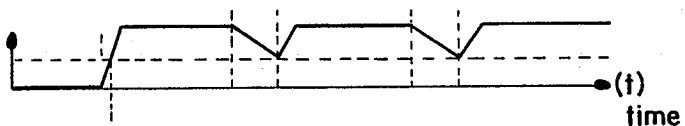
Figure 2F:
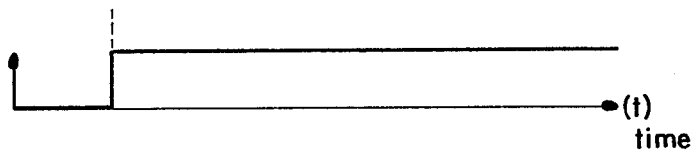

Referring now to FIG. 2 illustrating waveforms of each part of the preferred embodiment:

FIG. 2a shows the first synchronous signal generated from first synchronous signal detector 10;

FIG. 2b shows the second synchronous signal generated from second synchronous signal detector 20;

FIG. 2c shows a waveform of the compared signal of the first and second synchronous signal, in which said compared signal is generated by exclusive OR gate 30;

FIG. 2d shows a waveform of the pulse signal, having the time constant "tw", generated from monostable multivibrator 50;

FIG. 2e shows a waveform of DC current smoothed by the resistor 61 and capacitor 62; and FIG. 2f shows a waveform of the driving signal generated from transistor 71.

The preferred embodiment of the invention will now be explained hereinafter with reference to the FIG. 1 and FIG. 2.

First, the first synchronous signal detector 10 detects the first synchronous signal as shown in FIG. 2a of FIG. 2 from the main screen image source which is received through the image signal input terminal 1 in order to generate the first synchronous signal to an input line of the exclusive OR gate. Similarly the second synchronous signal detector 20 detects the second synchronous signal as shown in FIG. 2b from the subscreen image source received through the another image signal input terminal 2 in order to generate the second synchronous signal to another input line of the exclusive OR gate 30.

Accordingly, said exclusive OR gate 30 compares the first and second synchronous signals received through an input line and another input line, respectively, by executing the exclusive OR operation, by which the waveform shown in FIG. 2c is produced. Thereafter said compared signal is applied to the integrator 40, formed by resistor 41 and capacitor 42. Then, the integrator 40 integrates the compared signal from the exclusive OR gate so as to eliminate an impulse component of the signal and thereafter applies the integrated signal to an input terminal "B" of monostable multivibrator 50. In this case, the monostable multivibrator 50 has performance characteristics as shown in Table 1—1. Therefore, if a logic high signal is applied to the read terminal $\overline{RD}$, then the pulse signal having the given width according to the time constant "tw" which depends on the resistor 51 and the capacitor 52 is produced to the DC generator 60.

TABLE 1-1

| $\overline{RD}$ | $\overline{A}$ | B | Q | $\overline{Q}$ |
|---|---|---|---|---|
| L | X | X | L | H |
| X | H | X | L | H |
| X | X | L | L | H |
| H | L | ↑ | ⊓ | ⊔ |
| H | ↓ | H | ⊓ | ⊔ |
| ↑ | L | H | ⊓ | ⊔ |

Hence, exclusive OR gate 30 generates a logic low signal to the input terminal "B" of the monostable multivibrator 50 if the subscreen image source is identical to the main screen image source, whereas a logic high signal is generated if the two image sources are different from each other. Moreover, if another trigger pulse is received again within the time constant determined by the resistor 51 and capacitor 52 after the previous triggering, the monostable multivibrator 50 is re-triggered. Therefore the pulse signal shown in FIG. 2d generated from the monostable multivibrator 50 is applied to the DC generator 60 formed by resistor 61 and capacitor 62.

The resistor 61 and capacitor 62 of the DC generator 60 produces the smoothed DC signal as shown in FIG. 2e by integrating the signal from monostable multivibrator 50 and then output said smoothed DC signal to the base of the transistor 71 through the bias resistors 72 and 73. Accordingly the transistor 71 outputs the driving signal of FIG. 2f generated by switching operation of the transistor 71 to the plurality of switches 81 to 83 of the switching means 80, respectively. In this case, the plurality of switches 81 to 83 are grounded if a logic high signal is applied thereto, while said plurality of switches are switched on to the D/A converter 90 if a logic low signal is applied thereto.

Therefore the transistor 71 switches on and off the PIP control signal which is applied to the D/A converter 90 through the plurality of input lines 91 to 93 for controlling the PIP system, according to the state of the transistor 71. Hence, the D/A converter 90 receives the PIP control signal through the entire plurality of input lines input line 91 to 96 if the switching stage 80 is switched on to the D/A converter 90, and thereby produces the luminance signals for use in the subscreen to apply the luminance signals to subscreen through the output line 3. Whereas, if the switching stage 80 is switched off, namely grounded, the D/A converter 90 applies to the subscreen of the PIP system through the output line 3 the given art signal which is generated by the PIP control signal received through the PIP control signal input lines 94 to 96.

As a result, if the first and second image source are identical to each other, the PIP system has the subscreen which is processed by the art signal, while if said first and second image sources are different from each other, then the PIP system has a normal subscreen.

As described above, it is an advantage of the invention that the PIP system performs the art processing to the subscreen by using the switching means when the image sources of the main screen and the subscreen are identical to each other. Further, at a user's convenience, when said signals are identical to each other, a mosaic processing, a strobo processing as well as the art processing are available to adopt.

It is believed that the many advantages, of this invention will now be apparent to those skilled in the art. It will also be apparent that a number of variations and modifications may be made in the method and apparatus as shown without departing from the spirit and scope of this invention. Accordingly, the foregoing description is to be constructed as illustrative only, rather than limiting. This invention is limited only by the scope of the following claims.

What is claimed is:

1. An art processor for use in a picture-in-picture system, comprising:
   a first synchronous signal detector for detecting a first synchronous signal from a main screen image source applied through a main screen source input terminal;
   a second synchronous signal detector for detecting a second synchronous signal from a given subscreen image source applied through a subscreen source input terminal;
   an exclusive OR gate for comparing said first synchronous signal and said second synchronous signal by executing an exclusive OR operation;
   an integrator for low-pass filtering a signal compared by the exclusive OR gate in order to eliminate an impulse component thereof;
   a monostable multivibrator for producing a pulse signal with a given time constant according to a smoothed signal from the integrator and to a logic high signal which is applied to a read terminal thereof;
   a direct current generator for producing a smoothed direct current by low-pass filtering the pulse signal generated from the monostable multivibrator;
   a driving signal generator for producing a driving signal according to the smoothed direct current signal generated from said direct current generator;

switching means for switching a plurality of picture-in-picture control signal input lines according to the driving signal produced from said driving signal generator; and a D/A converter for receiving a picture-in-picture control signal through a plurality of picture-in-picture control signal input lines according to the state of the switching means, and providing a subscreen art signal or a given subscreen luminance signal through an output line thereof.

2. Video picture-in-picture system, comprising:

first means for detecting a first synchronous signal from a main screen image signal;

second means for detecting a second synchronous signal from a subscreen image signal;

logic means for providing a comparison signal by comparing said first synchronous signal and said second synchronous signal;

means for providing an integrated signal by filtering an impulse component of said comparison signal;

multistate means for producing in dependence upon said integrated signal and a logic input signal, a pulse signal with a given time constant;

means for generating a driving signal on the basis of said pulse signal;

means exhibiting a plurality of states, for switching a plurality of picture-in-picture control signals on the basis of the driving signal.

3. The video picture-in-picture system of claim 2, further comprising:

means for receiving input picture-in-picture control signals from among a plurality of available picture-in-picture control signals in dependence upon the state of the switching means, and for providing one of a subscreen art signal or a subscreen luminance signal on a basis of said input picture-in-picture control signals.

4. The video picture-in-picture system of claim 2, wherein said generating means comprises:

means for filtering said pulse signal to provide an intermediate signal; and means for converting said intermediate signal into said driving signal exhibiting a amplitude depending upon said the period of said pulse signal.

5. The video picture-in-picture system of claim 2, further comprised of means coupled to said multistate means, for controlling a time constant of said pulse signal.

6. The video picture-in-picture system of claim 2, wherein said logic means comprises an exclusive OR gate.

7. The video picture-in-picture system of claim 3, wherein said generating means comprises:

means for filtering said pulse signal to provide an intermediate signal; and means for converting said intermediate signal into said driving signal exhibiting an amplitude depending upon said the period of said pulse signal.

8. The video picture-in-picture system of claim 3, further comprised of means coupled to said multistate means, for controlling a time constant of said pulse signal.

9. The video picture-in-picture system of claim 3, wherein said logic means comprises an exclusive OR gate.

10. The video picture-in-picture system of claim 4, further comprised of means coupled to said multistate means, for controlling a time constant of said pulse signal.

11. The video picture-in-picture system of claim 4, wherein said logic means comprises an exclusive OR gate.

12. The video picture-in-picture system of claim 2, wherein said switching means comprises:

a first plurality of input terminals connectable to receive a first plurality of said control signals;

a second plurality of input terminals coupled to said picture-in-picture system and connectable to receive a second plurality of said control signals; and a first plurality of switches exhibiting said plurality of states by operationally responding to said driving signal, coupled to said first plurality of input terminals.

13. The video picture-in-picture system of claim 12, wherein said generating means comprises:

means for filtering said pulse signal to provide an intermediate signal; and means for coverting said intermediate signal into said driving signal exhibiting an amplitude depending upon said the period of said pulse signal.

14. The video picture-in-picture system of claim 12, further comprised of means coupled to said multistate means, for controlling a time constant of said pulse signal.

15. The video picture-in-picture system of claim 12, wherein said logic means comprises an exclusive OR gate.

16. The video picture-in-pieture system of claim 3, wherein said switching means comprises:

a first of input terminals connectable to receive a first plurality of said control signals;

a second plurality of input terminals coupled to said receiving means and connectable to receive a second plurality of said control signals; and a first plurality of switches exhibiting said plurality of states by operationally responding to said driving signal, interposed between said first plurality of input terminals and said converter to couple said first plurality of input terminals to said converter during one of said operational states.

17. The video picture-in-picture system of claim 16, wherein said generating means comprises:

means for filtering said pulse signal to provide an intermediate signal; and means for converting said intermediate signal into said driving signal exhibiting a amplitude depending upon said the period of said pulse signal.

18. The video picture-in-picture system of claim 16, further comprised of means coupled to said multistate means, for controlling a time constant of said pulse signal.

19. The video picture-in-picture system of claim 16, wherein said logic means comprises an exclusive OR gate.

20. A process for controlling a video picture-in-picture system, comprising:

detecting a first synchronous signal from a main screen image signal;

detecting a second synchronous signal from a subscreen image signal;

comparing said first synchronous signal and second synchronous signal, and generating an output pulse whenever one but not both of said first synchronous signal and said second synchronous signal exhibit first amplitude states;

generating a pulse signal exhibiting a time constant in response to reception of each said output pulse;

filtering said pulse signal to provide a driving signal exhibiting an amplitude depending upon occurrence of said pulse signal and said time constant; and controlling application of a plurality of picture-in-picture control signals to generate one of a subscreen art signal or a subscreen luminance signal in dependence upon said amplitude of said driving signal.

* * * * *